United States Patent Office 3,317,568
Patented May 2, 1967

3,317,568
DIHALOALKYL-SUCCINIC ACID AND DERIVATIVES
James C. Wygant, Creve Coeur, Richard M. Anderson, St. Louis, and Erhard J. Prill, Des Peres, Mo., assignors to Monsanto Company, St. Louis, Mo., a corporation of Delaware
No Drawing. Filed Mar. 4, 1965, Ser. No. 437,258
15 Claims. (Cl. 260—346.8)

This application is a continuation-in-part of (1) an application Ser. No. 405,819, filed Oct. 22, 1964, now abandoned, which application is a continuation-in-part of application Ser. No. 248,853, filed Jan. 2, 1963, now abandoned, and (2) an application Ser. No. 267,783, filed Mar. 25, 1963, now United States Patent 3,236,659 issued Feb. 22, 1966.

This invention generally relates to novel halogen-containing compounds, and particularly concerns 2,3-dihaloalkyl succinic anhydride and derivatives thereof and poly(2,3-dihaloalkyl) esters of polycarboxylic acids.

It is an object of this invention to provide new and useful halogen containing compounds. A particular object is to provide novel succinic compounds which contain halogen. Another particular object is to provide novel poly(2,3-dihaloalkyl) esters of polycarboxylic acids. Another object is to provide halogen-containing reactive compounds suitable as resin modifiers. Yet another object is to provide new flame retardant anhydride, acid, halide, and ester compounds which are especially useful in admixture with natural and synthetic polymer systems.

These and other objects hereinafter mentioned have been accomplished in the discovery and synthesis of new and useful acid anhydrides, acids, acyl halides, and esters containing at least one 2,3-dihaloalkyl moiety therein. These compounds may be described more specifically as being those which have a chemical structure satisfying at least one of the following general chemical formulas.

(I)
$$R'-\underset{X}{C}H-\underset{X}{C}H-\underset{R}{C}-CH-C=O \diagdown O \diagup CH_2-C=O$$

(II)
$$R'-\underset{X}{C}H-\underset{X}{C}H-\underset{R}{C}-\underset{}{C}H-O-R'' \quad CH_2-\underset{O}{C}-R''$$

and (III)
$$\left[ R'-\underset{X}{C}H-\underset{X}{C}H-\underset{R}{C}-O\underset{O}{C}- \right]_x Y$$

wherein each X is either bromine or chlorine, each R is either hydrogen, methyl, or ethyl, each R' is either hydrogen or a lower alkyl having from 1 to about 5 carbon atoms, with R and R' being selected to provide the 2,3-dihaloalkyl moiety of which they form a part with about 12 carbon atoms or less, i.e., up to 12 carbons, each R" denotes one of the groups -hydroxyl, -chloride, -bromide, alkyloxy-, having from 1 to about 4 carbon atoms, hydroxyalkyloxy- having from 2 to about 6 carbon atoms, alkenyloxy- and alkynyloxy- radicals having from 3 to 6 carbon atoms, and haloalkyloxy- radicals containing one or more halogen atoms and having from 2 to about 6 carbon atoms, particularly bromoalkyloxy- and chloroalkyloxy of this type; x is an average number of from 2 to 6, and Y is selected from the group consisting of (a) monocyclic and dicyclic aromatic hydrocarbon radicals containing from 6 to 12 carbons and having six carbon atoms in each ring, some carbon atoms being part of two rings in fused ring hydrocarbon structures, said aromatic hydrocarbon radicals containing chlorine substituents, said aromatic hydrocarbon radicals containing bromine substituents, and mixtures thereof, (b) partially saturated and saturated monocyclic hydrocarbon radicals having from 3 to 6 carbon atoms in the ring and partially saturated and saturated dicyclic hydrocarbon radicals having from 6 to 12 carbon atoms and having 6 carbon atoms in each ring, some carbon atoms being part of two rings in fused hydrocarbon ring structures, said saturated monocyclic and dicyclic hydrocarbon radicals having bromine or chlorine substituents or mixtures thereof, (c) saturated acyclic aliphatic hydrocarbon radicals containing from 1 to about 15 carbon atoms, and said saturated acyclic aliphatic hydrocarbon radicals having bromine or chlorine substituents or mixtures thereof, and (d) a single chemical bond between two carboxyl carbon atoms.

Specific anhydride compounds of this type included within the scope of this invention i.e., those having the Formula I above are:

2,3-dibromopropylsuccinic anhydride,
2,3-dichlorobutylsuccinic anhydride,
2,3-dibromo-1-methylpropylsuccinic anhydride,
2,3-dichloro-1,1-dimethylpropylsuccinic anhydride,
2,3-dibromo-1-ethylpropylsuccinic anhydride,
2-bromo-3-chloro-1-methylbutylsuccinic anhydride,
2,3-dibromo-1,1-dimethylbutylsuccinic anhydride,
2,3-dichloro-1-ethylbutylsuccinic anhydride,
2,3-dibromopentylsuccinic anhydride,
2,3-dibromo-1-methyloctylsuccinic anhydride, and
2,3-dibromo-dodecylsuccinic anhydride.

Halogenated alkylsuccinic anhydrides of this exemplified type may be used as such or may be converted to compounds of Formula II above, i.e., the respective haloalkylsuccinic acid, acid halide, or monoalkyl or monoalkenyl esters thereof by known methods, for example, by treating them with water to obtain the acid or with an alcohol to open the anhydride ring and form the respective haloalkyl succinic acid half ester with the alcohol or alcohol mixture used. For example, 2,3-dibromopropylsuccinic anhydride may be treated with methanol. By such treatment the anhydride ring would be cleaved and the compound would be converted to the 2,3-dibromopropylsuccinic acid half methyl ester. If desired, the diester form can also be prepared by more strennuous (and expensive) catalytic esterification with the desired alcohol. Thus, by "esters" of the 2,3-dihaloalkylsuccinic acid is meant monoesters and diesters of 2,3-dihaloalkylsuccinic acid prepared from straight or branched chained, or cyclic saturated or unsaturated monohydric, dihydric, or polyhydric aliphatic alcohols preferably having not more than twelve carbon atoms including the alkanols such as methanol, isopropanol, butanol, hexanol, decanol, dodecanol, and the halogenated alkanols such as 2,3-dichloro-1-propanol, 2,3-dibromo-1-propanol, 3,4-dibromo-1-butanol, etc., the alkenols such as allyl alcohol, 2-buten-1-ol, 2-hexen-1-ol, 2-octen-1-ol, the alkynols such as propargyl alcohol, butynol which can then be saturated with bromine, chlorine, or mixtures thereof if desired to prepare haloalkyl ester radicals, the cycloalkanols such as cyclohexanol and cyclopentanol, the equivalent cycloalkenols such as cyclo-3-hexen-1-ol, and cyclo-3-penten-1-ol, and the dihydric and polyhydric aliphatic saturated and unsaturated alcohols such as ethylene glycol, propylene glycols, butane glycols and butene glycols, diethylene glycol, dipropylene glycol, pentaerythritol, and halogen containing alcohols such as 2-bromopropanol, etc. as well as the aromatic alcohols such as benzyl alcohol, cinnamyl alcohol, phenyl ethyl alcohol, as well as the so called aromatic alcohols having the hydroxyl group on the aromatic ring such as phenol, the cresols, thymol, xenol, catechol, resorcinol, hydroquinone, pyrogallol, phloroglucinol, etc. Monohydric aliphatic saturated and olefinically unsaturated alcohols having up to about 12 carbon atoms in general, and lower alkanols and lower alkenols having 6 carbon atoms or less such as methanol, ethanol and allyl alcohol in particular are preferred. If desired the aliphatic olefinically unsaturated alcohol esters of these 2,3-dihaloalkylsuccinic compounds may be saturated by treatment of the unsaturated ester of the 2,3-dihaloalkylsuccinic acid with halogen to increase the halogen content of the product.

The halogen-containing succinic compounds of this invention i.e. compounds of Formulae I and II above, are conveniently prepared by halogen addition to the appropriately substituted allyl succinic compound such as allylsuccinic anhydride or to an allyl ester of allylsuccinic anhydride. For example direct addition of bromine is generally accomplished at low temperatures (i.e., from about minus twenty-five to plus fifty degrees centigrade) using a solvent such as chloroform, carbon disulfide, acetic acid, diethyl ether or the like. Strong heating promotes substitution and dehydrohalogenation and is not recommended. Additions with more reactive gaseous chlorine are best carried out slowly at still lower temperatures (i.e., from about minus fifty to plus twenty-five degrees centigrade) to avoid side reactions. Sulfuryl chloride and phosphorus pentachloride can be used as chlorinating agents where preferred. Mixed dihalides may be prepared by substitution reactions, for example, a bromochloride is formed by treating a dichloride with a molar equivalent of sodium bromide in acetone. Obviously these new succinic compounds are preparable from one another. For example (2,3-dihaloalkyl) succinic acid is formed by boiling (2,3-dihaloalkyl) succinic anhydride in water for several minutes; (2,3-dihaloalkyl) succinic halide is formed from the dihalo anhydride or the dihaloacid on treatment with thionyl chloride; esters of (2,3-dihaloalkyl) succinic acid are prepared from the dihalo acid or, preferably, from the dihalo anhydride by heating with the appropriate alcohol; etc. In the last mentioned instance (the ester preparation) the reaction is shifted towards the right by an excess of alcohol, by removal of water either by azeotropic distillation, or by means of a suitable drying agent, etc. Unless otherwise specified standard procedures and conditions are best employed in preparing and reacting these novel compounds, however, any convenient method may be used.

As indicated above in the general definition of the new compounds of this invention, and as illustrated above in describing compounds of Formulae I and II the 2,3-dihaloalkyl moiety may also be present as an ester moiety of the new compound.

Additional types of new compounds within the scope of the invention where such moiety is present in the ester moiety are those depicted by Formula III above.

Compounds of Formula III are characterized as having multiple (i.e., at least 2) 2,3-dihaloalkyl carboxylic ester groups. By the term "2,3-dihaloalkyl carboxylic ester group" is meant a radical having the structural formula of an ester

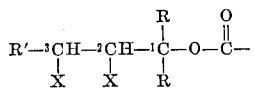

where each X is a halogen atom, preferably bromine or chlorine, each R is hydrogen, methyl, or ethyl, and R' is hydrogen or alkyl having up to about 5 carbon atoms.

The polycarboxylic acids which are used in the formation of these new esters from a structural standpoint are aromatic, partially and fully saturated alicyclic, or acyclic aliphatic acids. It is understood that in the actual preparation of these new esters, the appropriate polycarboxylic anhydrides may also be used. Such acids and anhydrides which have been brominated, chlorinated, and which contain small saturated aliphatic hydrocarbon side chains may also be used. The portion of the polyacid moiety of the new esters of this invention represented by the symbol Y may thus be purely hydrocarbon in nature, or may be such hydrocarbon having chlorine or bromine substituents, or mixtures thereof.

The aromatic esters include those compounds in which the 2,3-dihaloalkyl carboxylic ester groups are attached directly to an aromatic ring, esters in which some of the ester groups are attached to the ring and others in separate side chains, and esters in which all the ester groups are in separate side chains of the Y moiety. Thus when Y is aromatic it may consist of a single benzene ring, a naphthalene ring or other condensed ring system containing from 2 to 6 carboxyl groups. Less important equivalent esters are those wherein Y contains several aromatic rings singly or doubly linked together or several aromatic rings connected by alkyl rings and/or chains.

Examples of these new ester compounds include poly-(2,3-dihaloalkyl) esters of the following acids: phthalic acid, isophthalic acid, terephthalic acid, 3-methylphthalic acid, 4-tertiarybutylphthalic acid, 3,4-dimethylphthalic acid, 5-methylisophthalic acid, methylterephthalic acid, homophthalic acid, homoisophthalic acid, homoterephthalic acid, ortho-phenylene diacetic acid, meta-phenylene diacetic acid, para-phenylene diacetic acid, ortho-phenylene acetic-propionic acid, meta-phenylene dipropionic acid, trimesic acid, trimellitic acid, pyromellitic acid, mellophanic acid, prehnitic acid, benzenepentacarboxylic acid, mellitic acid, naphthalic acid, diphenic acid, chyrsodiphenic acid, 3,4,9,10-perylenetetracarboxylic acids, etc.

The Formula III alicyclic polycarboxylic esters have the (2,3-dihaloalkyl) ester groups attached directly to a partially saturated or saturated hydrocarbon ring, such esters groups attached to the ring and to separate side chains, or all the ester groups located on separate side chains. These partially saturated and saturated hydrocarbon rings may be otherwise unsubstituted if desired or may have chlorine, bromine, alkyl or aryl substituents, and/or be joined to form bicyclic or other higher ring systems. Partially saturated polycarboxylic acid esters of this invention that are included within Formula III are those having from 5 to 6 carbon atoms in the hydrocarbon ring system which may have from one to two olefinic bonds between said ring carbon atoms, and which ring carbon atoms may or may not be substituted with halogen atoms such as chlorine or bromine. Compounds of this type may be prepared by esterifying the 2,3-dihaloalkanol alcohol with the respective partially saturated polycarboxylic acid which may be prepared in a variety of ways such as by condensing a conjugated diene hydrocarbon, having say 4 to 6 carbons such as butadiene or isoprene, etc. with maleic anhydride, itaconic anhydride, aconitic anhydride, citraconic anhydride, etc. The term is also intended to cover the partially saturated esters prepared by hydrogen-saturating an aromatic ester. Examples of new ester products of this invention of this type include bis(2,3-dibromopropyl) tetrahydrophthalate [bis-(2,3-dibromopropyl) cyclohexene-1,2-dicarboxylate], bis-(2,3 - dichlorobutyl) cyclopentene-1,2-dicarboxylate, the tris(2,3-dibromopropyl)( ester of the condensed product of cis-aconitic anhydride and isoprene, and the bis(2,3-dichloropropyl) ester of partially saturated naphthalic acid.

Exemplary fully saturated esters included within this category of the invention may be considered the poly-(2,3-dihaloalkyl) ester derivatives of the following acids: cyclopropane-1,1-dicarboxylic acid, cyclopropane-1,1,3-tricarboxylic acid, cyclobutane-1,3-dicarboxylic acid, cyclobutane 1,2,3-tricarboxylic acid, cyclopentane-1,2-dicarboxylic acid, cyclopentane-1,2,3-tricarboxylic acid, cyclohexane-1,1-dicarboxylic acid, cyclohexane-1,2-dicarboxylic acid, cyclohexane-1,3-dicarboxylic acid, cyclohexane-1,4-dicarboxylic acid, cyclohexane-1,3,5-tricarboxylic acid, cyclohexane-1,1,3,3-tetracarboxylic acid, cyclohexane-1,1-diacetic acid, cyclohexane-1-carboxylic-3-acetic acid, camphoric acid, cyclodecane-1,2-dicarboxylic acid, etc.

The Formula III acyclic aliphatic polyesters of present concern include those compounds in which the acid moiety of the ester and Y denotes a chemical bond, or has straight or branched saturated hydrocarbon chains. The 2,3-dihaloalkyl ester groups may be attached to the same carbon atom or to different carbons.

Specific compounds included within this class may be looked on as 2,3-dihaloalkyl esters of the following carboxylic acids: oxalic acid, malonic acid, succinic acid, glutaric acid, adipic acid, pimelic acid, suberic acid, azelaic acid, sebacic acid, brassylic acid, thapsic acid, methylmalonic acid, methylsuccinic acid, alpha, beta-dimethylsuccinic acid, alpha,alpha,beta-trimethylglutaric acid, tricarballylic acid, 1,1,5-pentanetricarboxylic acid, 1,2,4-hexanetricarboxylic acid, methanetetracarboxylic acid, ethane-1,1,2,2-tetracarboxylic acid, butane-1,2,3,4-tetracarboxylic acid, propane-1,1,2,3,3-pentacarboxylic acid, etc.

The poly(2,3-dihaloalkyl) esters included within the scope of the present invention (whether aromatic, alicyclic, or aliphatic) generally have no more than 30 carbon atoms and, usually, 15 or less. Obviously there will always be at least 8 carbon atoms in the molecule.

They can have halogen substituents in the acid portion of the molecule (i.e., halogen elsewhere than in the 2,3-dihaloalkyl groups). In the case of the aromatic polyesters these "additional halo groups" may be located on the aromatic nucleus or its side chains; alicyclic-type esters may have halo groups attached to the ring or side chains; and the aliphatic polyesters may have halogen atoms on the main chain or branches thereof. As a rule there will not be more than 4 such halogens in the acid portion of the molecule and, commonly, there will only be 2 halogens.

As a rule the aromatic poly(2,3-dihaloalkyl) "polyesters" are preferred over the alicyclic polyesters and the alicyclic polyesters are in turn preferred over the acyclic aliphatic polyesters. Also for certain purposes the compounds containing additional halogen (i.e., halogen in the acid portion of the polycarboxylic ester) are preferred over the hydrocarbon compounds.

The poly(2,3-dihaloalkyl) carboxylic esters of the polyacids herein disclosed are conveniently prepared by addition of halogen to the corresponding unsaturated esters. The reaction is generally run at low temperature (i.e., −25° to +50° C.) using a solvent such as chloroform, carbon tetrachloride, carbon disulfide, acetic acid, diethyl ether, etc. Strong heating is not recommended because it promotes substitution and dehydrohalogenation. For the same reason reaction is usually carried out in the dark. Also it is best to avoid using an excess of halogen. The halogenation reaction is generally complete in approximately 1–6 hours. Often a trace of hydrogen halide is added as a catalyst.

This method is particularly suitable for preparing bromine-containing polyesters. For instance bis(2,3-dibromopropyl) phthalate is obtained from diallyl phthalate on treatment with 2 moles of bromine; bis(2,3-dibromopropyl) succinate is made from diallyl succinate by addition of bromine; etc.

Additions with more reactive gaseous chlorine are also readily accomplished; however, there is more danger of hydrogen substitution than with bromine. Chlorinating agents such as sulfuryl chloride and phosphorus pentachloride are preferred where good yields are difficult to obtain by direct reaction with gaseous chlorine.

Mixed halides (e.g., polyesters containing 2 or more halides) are obtained by using a mixture of halogens to react with the allyl esters. Bromochlorides are for example prepared by the action of bromine and chlorine on olefins.

Where poly(2,3-dihaloalkyl) carboxylic esters are desired having halogen contained in the acid portion of the ester several procedures are possible depending on whether or not these additional halogens are aromatic or alkane substituents.

Direct halogenation on aromatic rings occurs when halogen is introduced in the presence of an ionic catalyst, (e.g., ferric halide, aluminum halide, antimony pentahalide, etc.). This process usually is carried out as a separate step after halogen addition to form the poly(2,3-dihaloalkyl) carboxylic ester groups.

Where it is desired that additional halogens be present as alkane substituents (either on rings or chains) a single step halogenation process is convenient using the corresponding unsaturated hydrocarbon polyester as starting material. For example bis(2,3-dibromopropyl)-4,5-dibromocyclohexane-1,2-dicarboxylate is prepared from diallyl tetrahydrophthalate by single step bromination; bis(2,3-dibromopropyl) 2,3-dibromosuccinate is easily formed by brominating diallyl fumarate; etc.

An alternate general process for preparing any of the compounds of this invention is reaction of the desired polycarboxylic acid or its equivalent (e.g., anhydride, polyester, etc.) with a 2,3-dihaloalkyl alcohol. Esterification is usually effected by refluxing the acid and the alcohol with a small amount of sulfuric acid, hydrochloric acid, or arylsulfonic acid such as p-toluenesulfonic acid. Equilibrium is shifted to the right by an excess of one of the reactants or by removal of water either by azeotropic distillation or by means of a suitable drying agent.

Flame-retardant compositions containing these new halo esters may be prepared in several ways—the following described compositions and methods being set forth as illustrative.

Natural products are advantageously modified by the present compounds, providing flame-retardant compositions. Prime examples of substances which are beneficially modified are the fibrous cellulosic materials. This includes, for example, paper cardboard, pressed board, wood, wood pulp, sawdust, cotton, linen, batting twines, kapok, and regenerated cellulose. The present halogenated compounds are also beneficially used with the natural gums such as agar, gum arabic, tragacanth, gum karaya, etc. Natural rubber and natural resins, such as shellac, copal, damar, pine balsam, rosin, etc., are favorably modified by the halo esters of this invention. Other substances favorably modified by the present compounds are the proteinaceous polymeric materials, such as animal glue, casein, wool, leather, etc.

The present halogenated compounds are advantageously employed as modifiers in synthetic resinous materials. Besides being generally useful as flame-retardants, these 2,3-dihaloalkyl compounds are also useful as plasticizers and facilitate compounding and improve flexibility and other properties of the finished resin. The 2,3-dihaloalkyl anhydride, acid, and acid halide compounds of this invention are also advantageously used as reactants in the making of flame resistant polyesters, polyamides, etc. by reacting them with appropriate polyhydric alcohols, or polyamines, etc. A partial listing of resins advantageously modified by these compounds is presented below:

(1) *Acrylic resins.*—This group includes polymerized acrylyl and alkacrylyl compounds, such as acrylic acid and methacrylic acid, esters of these acids, acrylonitrile, etc. Special attention is directed towards the polymers prepared from acrylonitrile and the methyl and ethyl acrylates and methacrylates and, also, the acrylonitrile/vinyl chloride copolymers as being particularly suitable for use with the present compounds.

(2) *Cellulose derivatives.*—Included herein are the cellulose esters such as cellulose acetate, cellulose triacetate, cellulose nitrate, cellulose propionate, cellulose acetate butyrate, ethyl cellulose, cellophane, and similar products.

(3) *Coumarone/indene resins.*—These are thermoplastic addition products obtained by heating mixtures of coumarone and indene (such as occur in the light oil fraction from coal tar refining) with acid.

(4) *Epoxy resins.*—These resin are condensation products formed by reaction of a polyhydroxy compound (e.g., ethylene glycol) and epichlorohydrin. Also included herein are the cross-linked products which have been cured with polyacids, polyamines, or the like.

(5) *Furan resins.*—This term refers to homopolymers of furfuryl alcohol, and also to resins obtained by condensation of phenol with furfural or furfuryl alcohol, and to furfural/ketone copolymers. Both cured and uncured resins are advantageously modified by the presently disclosed compounds.

(6) *Melamine resins.*—These are synthetic resins of the thermosetting type, made from melamine and formaldehyde. The lower molecular weight, uncured melamine resins are water soluble syrups; the higher molecular weight materials are less soluble or insoluble and usually solids. All mentioned types are favorably modified by the present compounds.

(7) *Phenolics.*—These are condensation products produced by reaction of aldehydes (e.g. formaldehyde, acetaldehyde, etc.) with the active hydrogens of phenol or substituted phenols (e.g. cresols or xylenols) which products are usually subsequently heat cured.

(8) *Polyamides.*—These are polymers made by condensation of diamines (or lactams or amino acids) with dibasic acids. Nylon (which is included here) is especially favorably modified by the present compounds.

(9) *Polyesters.*—Usually these synthetic resins are produced by reaction of saturated or unsaturated dibasic acid components such as phthalic anhydride, adipic acid, azelaic acid, maleic anhydride, fumaric acid, etc., with dihydric alcohols such as ethylene, propylene, diethylene, dipropylene, and certain butylene glycols. In a few cases trifunctional monomers such as glycerol or citric acid are used. The modifiers of this invention are particularly useful for treating the polyesters made with the unsaturated dibasic acids as these can be further polymerized through cross-linking. Often another unsaturated monomer such as styrene, vinyltoluene, diallyl phthalate, methyl methacrylate, or triallyl cyanurate is used in this second stage.

(10) *Polyalkenes.*—This group includes polyethylene, polypropylene, polyisobutylene, etc. Low and medium-molecular weight polyethylene and solid, high-molecular weight polyethylene, whether of low, medium or high-density may be modified. Similarly the various types of polypropylene and isobutylene are within the scope of this invention. Of special interest are the alkene copolymers with other alkenes (e.g., ethylene/propylene copolymer) or with other unsaturated monomers (e.g., ethylene/vinyl chloride copolymer). The term alkene copolymer is intended to include polymers where the alkene is present in a major quantity (i.e., fifty percent or more).

(11) *Polystyrenes.*—Included herein are resins prepared from styrene, nuclear or side-chain substituted styrenes (e.g., alpha-methylstyrene), or other vinyl-substituted hydrocarbons (e.g., beta-vinylnaphthalene). The compounds of the present invention are particularly useful for modifying this group.

(12) *Polyurethane resins.*—These are synthetic polymers that may be either thermoplastic or thermosetting, usually made by action of tolylene diisocyanate or another polyisocyanate with polyols, polyols of polyethers or polyesters, or other materials containing hydroxyl groups. Polyurethane foams, flexible and rigid, are particularly beneficially modified with the compounds of this invention.

(13) *Vinyl resins.*—This comprises a group of thermoplastic resins prepared from monomers having a vinyl linkage. Specifically included herein are polyvinyl acetal, polyvinyl acetate, polyvinyl alcohol, polyvinyl carbazole, polyvinyl chloride and polyvinyl chloride/acetate. The polyvinyl acetal resins are formed by condensation of acetaldehyde or any other aldehyde (e.g., formaldehyde and butyraldehyde) and polyvinyl alcohol.

(14) *Urea-formaldehyde resins.*—Urea and formaldehyde are united in a two-stage process to form intermediates (methylolurea, dimethylolurea) that are mixed with fillers and converted to thermosetting insoluble infusible resins.

The natural and synthetic materials aforementioned, and others, are rendered flame-retardant when contacted with the present halogenated compounds in appropriate proportions. Treatment may be accomplished in several ways:

Finished articles (e.g., paper, cotton, wood, etc.) are conveniently coated or treated with the halides of this invention by employing a volatile solvent such as methyl ethyl ketone, acetone, methanol, diethyl ether, or the like as carriers. Commonly from about fifteen to about sixty weight percent solutions are used depending on the type of material, the degree of flame-retardance desired, etc. In practice a thirty-five weight percent solution is employed as a "rule of thumb." Obviously, a carrier is not required and the halides can be applied directly. Treatment varies from about a minute, to an hour, or several days depending on the particular halogenated compounds, its concentration, etc., and may be by brushing, spraying or dipping.

In a preferred procedure the appropriate halide is compounded or blended in the material, which is to be modified, during or before final fabrication. Generally the halogenated compounds of this invention are added in quantities which are about five to forty-five weight percent and, preferably ten to thirty weight percent, based on the material to be modified. But as little as one weight percent can be used to give reduced burning rates, and at the other extreme, a sixty weight percent or more is often used for preparing plastisols. Any of the standard compounding or blending methods may be used for incorporating the present halides, for example, calendering, casting, extrusion, etc.

The above discussion has been directed towards attaining modified substances and particularly flame-retardant compositions by the use of various physical techniques. However, a much preferred method for attaining the latter involves chemically, rather than physically, incorporating the flame-retardant compound. Reference is made to application, S.N. 248,851 and application, S.N. 248,858, both filed on Jan. 2, 1963. The former discloses polyester resinous compositions and the latter discloses polyurethane resins, both having (2,3-dihaloalkyl)succinic compounds chemically combined therein. Likewise the (2,3-dihaloalkyl)succinic anhydride, acid and acid halide compounds of this invention can be chemically incorporated in other polymeric systems to provide "built in" flame-retardancy.

Of the new compounds herein disclosed probably the most suitable and useful of Formulae I and II are the di- and hexa- bromides, that is, (2,3-dibromoalkyl)succinic anhydride; (2,3-dibromoalkyl)succinic acid; the methyl, ethyl, hydroxyethyl esters of (2,3-dibromoalkyl)succinic acid; and bis(2,3-dibromopropyl) 2,3-dibromopropylsuccinate, etc., the most useful compounds of Formula III are the bis(2,3-dibromopropyl) phthalates, and the bis(2, 3-dipropyl) brominated cyclohexane dicarboxylate esters. Since the bromides seem to afford better flame-retardance than the other halides they are fully described and characterized in the following examples as being the best contemplated embodiment of this invention.

EXAMPLE 1

*(2,3-dibromoalkyl)succinic anhydride and acid*

A mixture of 600 g. of maleic anhydride (6.1 moles), 5.0 g. of p-t-butylcatechol (polymerization inhibitor), and 600 ml. of benzene, diluent, is placed in a steel bomb.

Propylene, 490 g. (11.6 moles), is introduced and the bomb heated at 200° C. for about 12 hours. After the bomb is opened, the benzene is removed leaving a yellow-brown solution. Distillation through a packed column gives 245 g. of allylsuccinic anhydride, B.P. 131–132° C./9.0 mm.

A solution of 140 g. (1 mole) of allylsuccinic anhydride in 125 ml. of acetic acid is placed in a 1-liter flask equipped with a reflux condenser, a dropping funnel, an electric stirrer, and a thermometer. To this is added a solution of 165 g. (1.03 moles) of bromine in 100 ml. of acetic acid over a period of about 40 minutes. During the addition an ice bath is used to maintain the temperature at 20–25° C. After being stirred for about 18 hours at room temperature, acetic acid is removed from the reddish-orange solution under vacuum. The product is then distilled at 193° C./2.0 mm. (pot. 204° C.); as the distillation proceeds the B.P. varies from 187° C./1.2 mm. (pot. 198° C.) to 200° C./2.2 mm. (pot. 224° C.).[1]

The (2,3-dibromopropyl)succinic anhydride, a viscous, pale yellow oil, weighs 261 g. (87% yield).

*Analysis.*—Calcd. for $C_7H_8Br_2O_3$: C, 28.0%; H, 2.70%; Br, 53.3%. Found: C, 28.3%; H, 2.75%; Br, 53.0%.

Hydrolysis readily gives (2,3-dibromopropyl)succinic acid, as is confirmed by standard analysis. The dibromo acid is also prepared by direct addition of bromine using the procedure given above.

EXAMPLE 2

Esters of (2,3-dibromopropyl)succinic acid can be synthesized from the dibromo anhydride on the dibromo acid by the usual methods. The following is an example.

A flask equipped with a distillation trap, an electric stirrer, and a thermometer is charged with 60.0 g. of ethylene glycol (0.97 mole), 36.0 g. of (2,3-dibromopropyl)succinic anhydride (0.12 mole) and 40 ml. of xylene.[2] The contents are esterified by refluxing at 145° C. After about 2 hours the reaction is stopped, as much xylene and excess glycol as possible are removed via the distillation trap, and the system is evacuated at 130° C. for 15 minutes. Thirty-eight g. of the di(2-hydroxyethyl) ester of (2,3-dibromopropyl)succinic acid is obtained.

EXAMPLE 3

Using an excess of methanol, and sulfuric acid as esterification catalyst, by reacting (2,3-dibromopropyl)succinic anhydride with methanol there is obtained the dimethyl ester of 2,3-dibromopropylsuccinic acid.

EXAMPLE 4

By a similar procedure to that described in Example 3 except that ethyl alcohol is substituted for methanol there is obtained as product the diethyl ester of 2,3-dibromopropylsuccinic acid.

EXAMPLE 5

Using the procedure of Example 1 except that 1-butene is substituted for propylene for reaction with maleic anhydride, and the resulting butenylsuccinic anhydride is brominated as described in Example 1 there is obtained as product 2,3-dibromobutylsuccinic anhydride. This product likewise has excellent flame retarding characteristics and is useful as a resin modifier.

EXAMPLE 6

The procedure of Example 1 is followed except that 2-butene is substituted for propylene for reaction with the maleic anhydride. The resulting product is brominated and there is obtained as product 2,3-dibromo-1-methylpropylsuccinic anhydride.

EXAMPLE 7

Using the procedure of Example 1, diallyl oxalate prepared by esterifying one molar proportion of oxalic acid with four molar proportions of allyl alcohol, using the excess alcohol as a diluent, and about one percent by weight, based on the weight of oxalic acid of p-toluenesulfonic acid as catalyst, and recovered from the reaction mixture by vacuum distillation, is brominated to obtain bis(2,3-dibromopropyl) oxalate.

EXAMPLE 8

*The dibromosuccinic compounds as modifiers for natural and synthetic materials*

A 35% by weight solution of (2,3-dibromopropyl)succinic anhydride in methyl ethyl ketone[3] is prepared and paper,[4] cotton,[5] and wood[6] are soaked therein. The paper and cotton are submerged for about one minute and the wood is soaked for 15 minutes. After treatment the impregnated samples are thoroughly dried and tested over a flame.[7]

The paper, cotton and wood are all self-extinguishing when removed from the flame.

Similarly (2,3-dibromopropyl)succinic acid solutions are prepared and used to treat paper, cotton and wood. Samples impregnated with these solutions are non-burning or self-extinguishing.

Similar runs are conducted using (2,3-dibromopropyl) succinic acid chlorides and equivalent results are obtained, i.e., treated paper, cotton, and wood have good flame-retardant properties.

Still other runs are made using methyl and ethyl diesters of (2,3-dibromopropyl)succinic acid. Testing confirms that the impregnated samples of paper, cotton and wood are substantially resistant to burning.

Flame-retardant polymers are prepared by incorporating the bromo compounds of this invention in commercially available resins as presented below:

To 10% ethylene dichloride solutions of polyvinyl acetate there is added (2,3-dibromopropyl)succinic monomethyl ester in quantities which are 10% and 30% by weight to that of the polyvinyl acetate present in the solution. Films cast from the resulting mixture are flexible and self-extinguishing. "Controls" prepared in the absence of the dibromo compound burst into flame under the same circumstances.

To a 5% solution of polyvinyl formal in ethylene dichloride there is added the dimethyl ester of (2,3-dibromopropyl)succinic acid in amounts which are 10% and 30% by weight to that of the polyvinyl formal present in the solution. Films cast from such solution are colorless after air drying for 24 hours and when held just outside the outer cone of a Bunsen burner flame, do not ignite. Under these circumstances the films burn readily when no additive is present. Similarly, films containing the diethyl ester of (2,3-dibromopropyl)succinic acid in 10% and 30% by weight are prepared, tested over a Bunsen burner, and found to be self-extinguishing.

Polystyrene is modified with the dimethyl and diethyl esters of (2,3-dibromopropyl)succinic acid. Blends with polystyrene are prepared on hot mill rolls. Each dibromo compound is used in amounts sufficient to make composi-

---

[1] In another run the (2,3-dibromopropyl)succinic anhydride distilled at 168–181° C./0.2–0.7 mm. (pot. 179°–194° C.).

[2] Xylene forms an azeotrope with water formed during the esterification; this is collected in the distillation trap and removed.

[3] Any easily volatile solvent can be used in place of the methyl ethyl ketone.

[4] Thin cotton patches are used which are 1½″ in diameter.

[5] Whatman Filter Paper No. 3 which cut in 6 x 2″ strips is used.

[6] The wood is pine in 6 x ¾ x 1/16″ splints and previously oven dried.

[7] The ASTM D1692-D59T test or modifications thereof is usually employed.

tions containing 10% by weight of additive. These compositions are pressed in sheets and cut in strips. All samples are flame-retardant.

These dibromo additives are compounded with other polymers with substantially the same results, i.e., the modified resins have good flame-retarding characteristics. Other polymeric materials treated include acrylic resins, cellulose derivatives, coumarone/indene resins, epoxy resins, furan resins, melamine resins, phenolics, polyamides, polyesters, polyalkenes, polyurethane resins, and urea formaldehyde resins.

EXAMPLE 9

To a reaction vessel there was added 70 g. (0.5 mole) of allylsuccinic anhydride, 102 ml. (1.5 mole) of allyl alcohol, 100 ml. of benzene and 1 g. of p-toluene-sulphonic acid. The mixture thus obtained was heated to reflux under a 6 inch Vigreux column and a Dean-Stark trap for 22.5 hours. During this time 11 ml. of water had collected. The solution was cooled and washed with two 100 ml. portions of water, 50 ml. of 5% sodium hydroxide, and then two 100 ml. portions of water. The solution was then distilled through a 10 inch Vigreux column. After removal of benzene and a few drops of fore-run, there was obtained 110 g. (98% of theory) of the diallyl allylsuccinate ester, B.P. 106–107° C/1.2–1.3 mm., which analyzed as containing 65.36% carbon, 7.70% hydrogen, as compared with 65.6% carbon and 7.6% hydrogen, the calculated value for $C_{13}H_{18}O_4$. The saponification equivalent found was 120 compared to the theroetical equivalent of 119.

To a reaction vessel there was added 47.6 g. (0.2 mole) of the diallyl allylsuccinate ester, prepared as above, in 50 ml. of carbon tetrachloride. An addition funnel attached to the reaction vessel was filled with 95.9 g. (0.6 mole) of bromine in 50 ml. of carbon tetrachloride. The ester solution was cooled to 5°–10° C. and the bromine solution was added to the ester solution over 1 hour and 10 minutes while stirring the mixture at 5°–10° C. At the end of the addition the mixture was stirred for an additional hour and allowed to warm to room temperature. The solution was stripped on a rotary evaporator at 20–30 mm. pressure over a pan of water at about 80° C. for 3 hours. There was obtained as a pale yellow oil bis(2,3 - dibromopropyl) 2,3 - dibromopropylsuccinate ester, $n_D^{25}$ 1.5638, which analyzed as containing 21.83% carbon, 2.33% hydrogen, and 66.81% bromine as compared with 21.7% carbon, 2.5% hydrogen, and 66.8% bromine, the calculated values for $C_{13}H_{18}Br_6O_4$.

This bis(2,3 - dibromopropyl) 2,3 - dibromopropylsuccinate is a highly efficient flame retardant for polymer systems. For example, films of polystyrene admixed with 5 percent and 10 percent by weight of this ester, based on the weight of the polystyrene were cast from solution. After drying, the films were treated by thrusting pieces of the treated polystyrene films into a Meeker burner flame and then withdrawing the film. The polystyrene films containing 10% of the ester were immediately self-extinguishing. The films containing 5% of the ester were somewhat less efficient in that part of the time the films were self-extinguished immediately upon removal from the flame, and part of the time the films burned a short time before extinguishing.

EXAMPLE 10

The dipropargyl ester of allylsuccinic anhydride is prepared by the procedure described in Example 9 except that about 1.5 moles of propargyl alcohol is used in place of allyl alcohol.

Upon complete bromination of the dipropargyl ester of allylsuccinic acid there is obtained bis(tetrabromopropyl) 2,3-dibromopropylsuccinate.

EXAMPLE 11

*Preparation of bis(2,3-dibromopropyl) phthalate*

A solution of 369 g. (1.5 moles) of diallyl phthalate in 200 ml. of carbon tetrachloride is placed in a black-painted flask. A solution of 480 g. of bromine (3 moles) in 200 ml. of carbon tetrachloride is gradually added over a period of 2 hrs. at 3°–6° C. After standing an additional hour at about 5° C., the resulting red solution is poured in a separatory funnel and washed with 300 ml. of 2% aqueous sodium hydroxide. This removes the reddish color. After final washing with water the organic phase is dried over anhydrous magnesium sulfate. The solution is filtered and the filtrate passed through a ¾ x 8 in. column of activated alumina. The carbon tetrachloride is distilled (rotary stripper) at 80°–90° C., under reduced pressure. The slightly turbid viscous residue is filtered through a heated funnel to yield a clear oil which is identified as bis (2,3-dibromopropyl) phthalate.

*Analysis.*—Calc'd for $C_{14}H_{14}Br_4O_4$: C, 29.7%; H, 2.5%; Br, 56.4%. Found: C, 29.8%; H, 2.5%, Br, 56.2%.

EXAMPLE 12

*Preparation of bis(2,3-dibromopropyl) isophthalate*

A 1-l. flask is charged with 166 g. (1.0 mole isophthalic acid, 500 g. (2.29 moles) 2,3-dibromo-1-propanol, 1.0 g.p-toluenesulfonic acid, and 200 ml. toluene. Esterification is carried out at 145° C., for 24 hours. About 32 ml. water is collected in a water trap. The hot toluene solution is washed with 5% sodium bisulfite. On cooling unreacted isophthalic acid separates and is removed by filtration. After a forerun bis(2,3-dibromopropyl) isophthalate distills at 145° C./0.01 mm.

*Analysis.*—Calc'd for $C_{14}H_{14}Br_4O_4$: C, 29.7%; H, 2.5%; Br, 56.4%. Found: C, 30.0%; H, 2.6%; Br, 55.9%.

EXAMPLE 13

*Preparation of bis (2,2-dibromopropyl) terephthalate*

A 2-l. pot fitted with a 12 in. helices-packed column is charged with 700 g. allyl alcohol, 295 g. dimethyl terephthalate, and 3 g. of sodium dissolved in methanol (50 ml.). About 250 ml. methanol-allyl alcohol is distilled off during 16 hrs. One l. of hexane is added to the pot and the reaction mixture filtered hot. The filtrate is stripped of hexane and distilled through a 6 x 1 in. Vigreux column. The dillayl terephthalate comes over at 145° C./ 1.5–2.0 mm.

A 1-l. flask is charged with 124.5 g. (0.50 mole) diallyl terephthalate, 500 g. carbon tetrachloride, and 165 g. (1 mole) bromine at ca. 10° C. (flask cooled with ice bath). After 16 hours a 5% solution of sodium bisulfite is added until the color disappears. The reaction mixture is washed with water, 5% sodium bicarbonate solution, and water. After drying over anhydrous magnesium sulfate the solvent is stripped off leaving a milky residue which solidifies on standing. The product is recrystallized from ether with 2% benzene to give bis(2,3-dibromopropyl) terephthalate, M.P. 82°–84° C.

*Analysis.*—Calc'd for $C_{14}H_{14}Br_4O_4$: C, 29.7%; H, 2.5%; Br, 56.4%. Found: C, 30.1%; H, 2.6%; Br, 55.9%.

EXAMPLE 14

*Preparation of bis(2,3-dibromopropyl) 4,5-dibromo-cyclohexane-1,2-dicarboxylate*

A solution of 350 g. (1.4 moles) of diallyl tetrahydrophthalate in 200 ml. of carbon tetrachloride is placed in a 2-l. reaction flask equipped with a paddle stirrer. The solution is cooled to 5°–10° C., and treated with 672 g. (4.2 moles) of bromine in 200 ml. of carbon tetrachloride which is added dropwise over 2 hrs. and 40 min. at 5°–10° C. After stirring an additional hr. at 5°–10° C., the reddish solution is transferred to a separatory funnel, washed with 200 ml. of 2% aqueous sodium hydroxide, and finally washed with several portions of water. The organic phase is dried over magnesium sulfate and filtered. The solvent is stripped off (rotary stripper at about 80° C./3 mm.). The bis(2,3-dibromopropyl) 4,5-dibromocyclohexane-1,2-dicarboxylate is recovered as a pale viscous oil.

*Analysis.*—Calc'd for $C_{14}H_{18}Br_6O_4$: C, 23.1%; H, 2.5%; Br, 65.7%. Found: C, 23.1%; H, 2.4%; Br, 66.1%.

EXAMPLE 15

*Preparation of bis(2,3-dibromopropyl) succinate*

A black-painted flask equipped with a mechanical stirrer, a condenser, and an addition funnel is charged with 299 g. (1.5 moles) of diallyl succinate in 200 ml. of carbon tetrachloride. A solution of 480 g. (3 moles) of bromine is added over 2½ hrs. at 5°–7° C. After stirring another hr. at 5° C., the solution is placed in a separatory funnel and washed with 250 ml. of 1% aqueous sodium hydroxide and with water. The solvent is removed under reduced pressure and the liquid residue distilled, B.P. 126°–131° C./1.7–3.5 mm. The slightly turbid distillate is passed through a 4″ column of activated alumina to give a pale yellow oil. This material is bis(2,3-dibromopropyl) succinate.

*Analysis.*—Calc'd for $C_{10}H_{14}Br_4O_4$: C, 23.2%; H, 2.7%; Br, 61.7%. Found: C, 23.2%; H, 2.7%; Br, 61.4%.

EXAMPLE 16

*Preparation of bis(2,3-dibromopropyl) 2,3-dibromosuccinate*

To a solution of 98 g. (0.5 mole) of diallyl fumarate in 100 ml. of carbon tetrachloride contained in a flask which is painted black is added a solution of 240 g. (1.5 moles) of bromine in 100 ml. carbon tetrachloride over 1½ hrs. at 5°–10° C., employing mechanical stirring. After standing for about 12 hrs. the carbon tetrachloride is removed from the reaction mixture by means of a rotary stripper. The resulting yellow oil slowly crystallizes to yield bis(2,3-dibromopropyl) 2,3-dibromosuccinate.

*Analysis.*—Calc'd for $C_{10}H_{12}Br_6O_4$: C, 17.8%; H, 1.8%; Br, 70.9%. Found: C, 18.3%; H, 1.9%; Br, 70.6%.

EXAMPLE 17

*Preparation of tris(2,3-dibromopropyl) trimellitate*

A 1-l. flask is charged with 135 g. (0.7 mole) trimellitic anhydride, 218 g. (2.1 moles) 2,3-dibromo-1-propanol, 2 g. p-toluenesulfonic acid, and 250 ml. toluene and heated to reflux. After 24 hrs. 25 ml. water collects in the water trap. The reaction mixture is washed with 5% sodium bisulfite, 5% sodium bicarbonate, and water and then dried over anhydrous sodium sulfate. The toluene solution is passed through an alumina column and the solvent remoxed under reduced pressure to give tris (2,3-dibromopropyl) trimellitate as a clear viscous liquid.

*Analysis.*—Calcd. for $C_{18}H_{18}Br_6O_6$: C, 26.8%; H, 2.2%; Br, 59.3%. Found: C, 27.1%; H, 2.3%; Br, 58.8%.

EXAMPLE 18

*Halogen-containing compounds as modifiers for cellulosic materials*

A 35% weight solution of bis(2,3 - dibromopropyl) phthalate in methyl ethyl ketone [8] is prepared and paper [9] cotton [10] and wood [11] are soaked therein. The paper and cotton are submerged for about one minute and the wood is soaked for 15 mins. After treatment the impregnated samples are thoroughly dried, treated over a flame, and found to be self-extinguishing.[12]

Other runs are conducted using bis(2,3-di-bromopropyl) isophthalate and bis(2,3-dibromopropyl)terephthalate and similar results are obtained, i.e., treated paper, cotton, and wood have good flame-retardant properties.

Still other runs are made using tris(2,3-dibromopropyl) trimellitate. Testing confirms that the impregnated samples of paper, cotton, and wood are substantially resistant to burning.

EXAMPLE 19

*Flammability of unsaturated polyesters containing halogen flame retardants*

To 20 g. portions of a polyester resin [13] sufficient flame retardant is incorporated to provide compositions containing each additive in 10%, 11.5% and 25% by weight which are cured by heating in the presence of a free-radical-forming catalyst [14]. Sections of the crosslinked polyesters, 3/16 x 1 x 1 in., are supported on a ¼ in. wire mesh 1⅜ in. above a burner. After a sample is ignited [15] for 20 sec. the flame is removed and the sample judged as self-extinguishing (S.E.) or, if the combustion continues, as burnable (B). The self-extinguishing samples are subjected to repeated 15 sec. ignitions. Results are indicated in Table 1.

TABLE 1

| Additive | No. of Ignitions | Flammability |
|---|---|---|
| Bis (2,3-dibromopropyl) phthalate, percent: | | |
| 10 | 1 | B. |
| 17.5 | 1 | S.E., 150 sec. |
|  | 2 | S.E., 90 sec. |
| 25 | 1 | S.E., 2 sec. |
|  | 2 | S.E., 3 sec. |
|  | 3 | S.E., 4 sec. |
|  | 4 | S.E., 8 sec. |
| Bis (2,3-dibromopropyl) 4,5-dibromocyclohexane-1,2-dicarboxylate, percent: | | |
| 10 | 1 | B. |
| 17.5 | 1 | S.E., 8 sec. |
|  | 2 | S.E., 16 sec. |
|  | 3 | S.E., 110 sec. |
| 25 | 1 | S.E., 2 sec. |
|  | 2 | S.E., 1 sec. |
|  | 3 | S.E., 4 sec. |
|  | 4 | S.E., 3 sec. |
| Bis (2,3-dibromopropyl) succinate, percent: | | |
| 10 | 1 | B. |
| 17.5 | 1 | S.E., 9 sec. |
|  | 2 | S.E., 13 sec. |
|  | 3 | S.E., 11 sec. |
|  | 4 | S.E., 140 sec. |
| 25 | 1 | S.E., 68 sec. |
|  | 2 | S.E., 6 sec. |
|  | 3 | S.E., 12 sec. |
|  | 4 | S.E., 2 sec. |
| Bis (2,3-dibromopropyl) 2,3-dibromosuccinate, percent: | | |
| 10 | 1 | B. |
| 17.5 | 1 | S.E., 10 sec. |
|  | 2 | S.E., 15 sec. |
|  | 3 | S.E., 17 sec. |
|  | 4 | S.E., 2 sec. |
| 25 | 1 | S.E., 3 sec. |
|  | 2 | S.E., 3 sec. |
|  | 3 | S.E., 3 sec. |
|  | 4 | S.E., 4 sec. |

EXAMPLE 20

*Flammability of polystyrene resins containing halogen flame-retardants*

The flame retardants (Table 2) are blended with powdered polystyrene in amounts sufficient for the desired

---

[8] Any easily volatile solvent can be used in place of the methyl ethyl ketone.
[9] Thin cotton patches aree used which are 1½ in. in diameter.
[10] Whatman Filter Paper No. 3 which is cut in 6 x 2 in. strips is used.
[11] The wood is pine in 6 x ¾ x 1/16 in. splints and previously oven dried.
[12] The ASTM D1692–D59T test or modifications thereof is usually employed.
[13] The polyester resin is prepared by condensing 2.1 moles of propylene glycol, 1 mole of phthalic anhydride, and 1 mole of maleic anhydride to form an unsaturated polyester which is dissolved in ⅓ its weight of styrene.
[14] The preferred catalyst is 50% benzoyl peroxide which is used in 3% by weight based on the unsaturated polyester-styrene mixture.
[15] Ignition temperature is about 900° C.

percent concentration and the mixture extruded, ground, and compression molded into ⅛ x ⅛ x 4.0 in. bars. Flammability is determined by A.S.T.M. testing procedure D635–56T. By this method the specimen sample is supported on a ⅜ in. wire gauze with about ½ in. of the specimen extending. For each attempt to ignite the specimen a burner [16] is placed so that the tip of the flame just contacts the end of the test specimen. At the end of 30 sec. the flame is removed. The extent of burning is measured along the lower edge of the specimen. If the specimen does not ignite, beyond the 1 in. mark the result is judged to be nonburning (NB). If the specimen burns but the flame goes out before the flame reaches a mark 3 in. from the end which is ignited, it is judged to be self-extinguishing (S.E.). If combustion continues beyond the 3 in. mark, the specimen is judged burnable (B). See Table 2 for results.

TABLE 2

| Additive | Flammability |
|---|---|
| Bis(2,3-dibromopropyl) phthalate, percent: | |
| 1.5 | B |
| 2 | NB |
| 4 | NB |
| 6 | NB |
| Bis(2,3-dibromopropyl) 4,5-dibromocyclohexane-1,2-di-carboxylate, percent: | |
| 1 | B |
| 2 | S.E. |
| Bis(2,3-dibromopropyl) succinate, percent: | |
| 3 | B |
| 5 | S.E. |
| 6 | NB |
| 8 | NB |
| Bis(2,3-dibromopropyl) 2,3-dibromosuccinate, percent: | |
| 2 | B |
| 6 | S.E. |

What is claimed is:

1. A compound of the formula selected from the group consisting of (I) 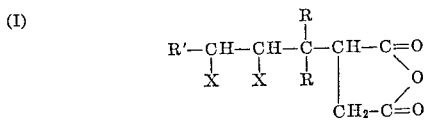

and (II) 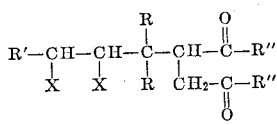

wherein X is selected from the group consisting of chlorine and bromine, each R is selected from the group consisting of hydrogen, methyl, and ethyl, each R′ is selected from the group consisting of hydrogen and alkyl groups having from 1 to 5 carbon atoms, said R and R′ being selected to provide said 2,3-dihaloalkyl moiety with up to 12 carbon atoms, each R″ is selected from the group consisting of -hydroxyl, -chloride, -bromine, alkyloxy- having from 1 to 4 carbon atoms, hydroxyalkyloxy- having from 2 to 6 carbon atoms, alkenyloxy- and alkynyloxy having from 3 to 6 carbon atoms, and chloroalkyloxy- and bromoalkyloxy- having from 2 to 6 carbon atoms.

2. 2,3-dibromopropylsuccinic anhydride.
3. 2,3-dibromopropylsuccinic acid.
4. A compound as described in claim 1 having Formula II wherein X is bromine, each R is hydrogen, R′ is hydrogen and each R″ is alkyloxy having from 1 to 4 carbon atoms.
5. Dimethyl ester of 2,3-dibromopropylsuccinic acid.
6. A compound as described in claim 1 having Formula II wherein X is bromine, each R is hydrogen, R′ is hydrogen, and R″ is hydroxyalkyloxy having from 2 to 6 carbon atoms.
7. Bis(2-hydroxyethyl) ester of 2,3-dibromopropylsuccinic acid.
8. A compound as described in claim 1 having Formula II wherein X is bromine, each R is hydrogen, R′ is hydrogen and R″ is bromoalkyloxy from 2 to 6 carbon atoms.
9. Bis(2,3-dibromopropyl) ester of 2,3-dibromopropylsuccinic acid.
10. An anhydride compound of Formula I as described in claim 1 wherein X is bromine, each R is hydrogen and R′ is alkyl having from 1 to 5 carbon atoms.
11. 2,3-dibromobutylsuccinic anhydride.
12. 2,3-dibromo-1-methylpropylsuccinic anhydride.
13. A compound as described in claim 1 having Formula II wherein X is bromine, R and R′ are each hydrogen, one R″ is hydroxyl and the other R″ is an alkyloxy radical having from 1 to 4 carbon atoms.
14. The monomethyl ester of 2,3-dibromopropylsuccinic acid.
15. The monoethyl ester of 2,3-dibromopropylsuccinic acid.

No references cited.

ALEX MAZEL, Primary Examiner.

H. R. JILES, Assistant Examiner.

---

[16] A standard ⅜ in. diameter Bunsen burner with air ports open to produce a blue flame approximately 1 in. high is employed.